United States Patent [19]

Benoit

[11] 4,307,864
[45] Dec. 29, 1981

[54] COMBINATION OF CAMPING ACCESSORIES AND ADJUSTABLE BRACKET

[75] Inventor: Raymond A. Benoit, Septeuil, France
[73] Assignee: Societe les Piles Wonder, France
[21] Appl. No.: 72,652
[22] Filed: Sep. 5, 1979

[30] Foreign Application Priority Data

Sep. 19, 1978 [FR] France .................................. 78 26829

[51] Int. Cl.³ ............................................. F16M 13/00
[52] U.S. Cl. .................................. 248/221.3; 248/481; 248/230
[58] Field of Search ................... 248/221.3, 221.4, 480, 248/484

[56] References Cited

U.S. PATENT DOCUMENTS

| | | | |
|---|---|---|---|
| 716,713 | 12/1902 | Hughes | 248/221.3 |
| 926,114 | 6/1909 | Hall | 248/230 |
| 1,303,345 | 5/1919 | McFeaters | 248/74 R X |
| 3,843,083 | 10/1974 | Angibaud | 248/226.3 |
| 4,148,454 | 4/1979 | Carlson | 248/221.3 |

FOREIGN PATENT DOCUMENTS 2212756  9/1973  Fed. Rep. of Germany ...... 248/484

Primary Examiner—William H. Schultz
Attorney, Agent, or Firm—Roylance, Abrams, Berdo & Farley

[57] ABSTRACT

A set of camping accessories comprising a range of accessories and hook-on clips, the clips being formed from two facing jaws provided with a common central clamping means and, at their ends, means for gripping, on the one hand, any body having a generally cylindrical shape and, on the other, a ball joint, each ball joint and each rear face of the accessories carrying either the male part or the female part of a rapid hook-on member.

9 Claims, 12 Drawing Figures

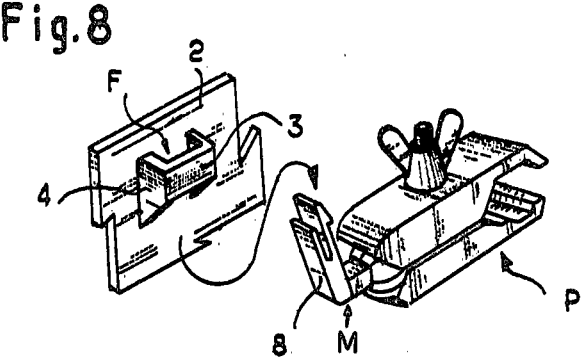
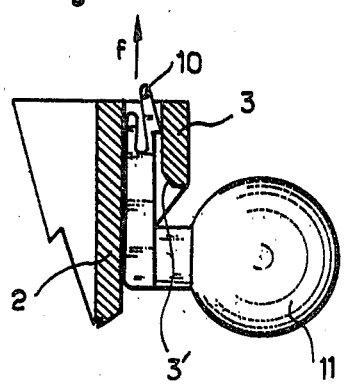
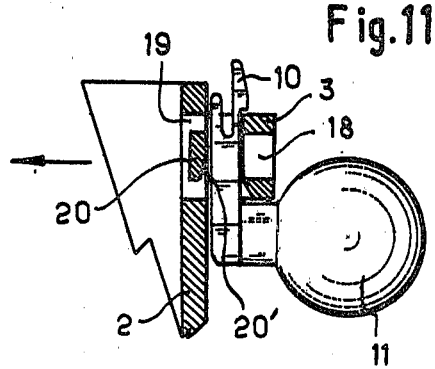
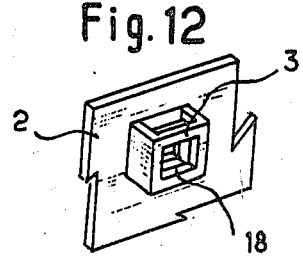
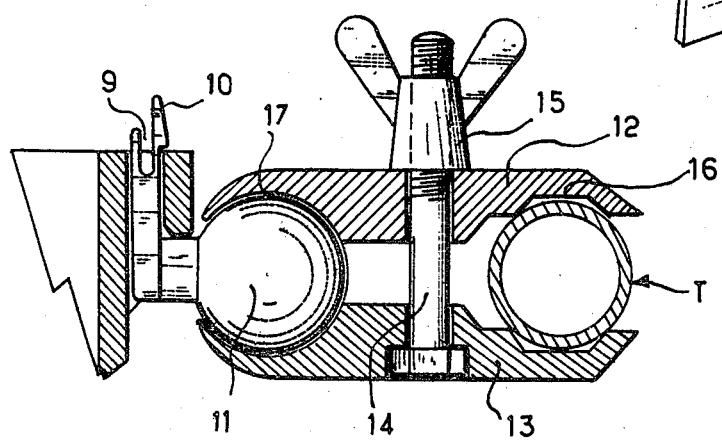

COMBINATION OF CAMPING ACCESSORIES AND ADJUSTABLE BRACKET

The invention relates to a set of camping accessories comprising a range of accessories and hook-on clips.

Campers, as well as all those who must occupy certain premises for a short or uncertain length of time, such as members of the staff of some work-sites, feel an increasing need for comfort. They contrive then to install in their tents, their living quarters and in other premises which they may have at their disposal, a whole range of accessories from the mirror to the toilet paper holder. It must however be recognized that up to now such installations are of the most make-shift, much use being made of wire and bits of string, which can only lead to a waste of time, irritability and discomfort.

An aim of the invention is to remedy these well-known and often deplored disadvantages. It originates from the observation that every tent, every work-site living quarters, every shelter however provisional or precarious it may be is very often provided with at the least one, and mostly several bodies having a general cylindrical shape, this term covering not only tent poles, heating pipes, electrical installation conduits and water inlets and other equally cylindrical bodies according to the mathematical definition of the term, but also those having a square or polygonal section such as certain small girders or other small constructional elements made from wood or plastic material, all these bodies being perfectly fixed or else integral with a relatively stable unit, such as a table leg or else, if necessary, provided by the user himself, such as a stake stuck in the ground.

Having made this observation, the invention relates to a set of accessories comprising a range of accessories and hook-on clips and it is characterized in that the clips are formed from two facing jaws provided with a common central clamping means and, at their ends, means for gripping, on the one hand, any body having a general cylindrical shape and, on the other hand, a ball joint, each ball joint and each rear face of the accessories carrying either the male part or the female part of a quick hook-on member.

It will be readily understood that the user, however lacking in ability he may be, will be able to rapidly lock the accessory which he desires to use with the ball joint by using the quick hook-on members, then dispose the clip so that, on the one hand, it grips for example a vertical tent post, or a horizontal pipe, or any suitable body whatever its orientation, whereas, on the other hand, it grips the ball joint orientated so that the accessory is in a position of use, i.e. horizontal if we consider the tray or else oblique or vertical if we consider the mirror, then finally actuate the common clamping means for fixing the whole permanently by a single manoeuvre, the accessory being firmly and conveniently placed for handy and prolonged use.

Advantageously, the rapid clamping means is a bolt with wing nut which passes through the two jaws, whereas these latter, which are identical carry on their internal face, on the one hand parallel indentations and, on the other, a cup having the same diameter as the ball joint.

The user thus has at his disposal an efficient, cheap and particularly easily handled clip.

The female part of the hook-on members is preferably, in accordance with the invention, carried by the rear face of each accessory, moulded with the accessory itself and formed by a vertical projecting channel in the position of use of the accessory considered. This channel has side faces advantageously chamfered to facilitate the penetration of the male part and perforated rear and front faces, if that will make the moulding operation easier. The front face is then, so as to guide the male part, provided with a cross piece whose lower rear end is chamfered in its turn. Similarly, and for the same purpose, the rear face of the channel may carry a slight chamfer at its front lower part.

As for the male part of the hook-on members, it is carried by the ball joints and is formed by a nose whose end is split to allow its rear part to form a resilient locking barb. Thus, without a perceptible increase in the cost price, there is provided a set which is particularly easy to use, the accessories being interchangeable while still being firmly locked to the clips as long as they are used.

The accompanying drawings represent one embodiment of the invention given by way of non-limiting example.

In these drawings:

FIG. 8 shows a clip and a hook-on member of this set.

FIG. 9 shows in partial section how the male part and the female part of the hook-on member cooperate during hooking on.

FIG. 10 shows in section the position of the assembly of the parts after hooking on.

FIG. 11 shows in section a variation of the female part of the hook-on member, and FIG. 12 shows the same female part in perspective.

So as to simplify the explanations, it will be noted straightaway that all the parts which will be described (with the exception perhaps of the bolt and its nut) are made preferably by moulding from a suitable plastic material. In all cases they are all designed to allow such a method of manufacture.

Figure 1:
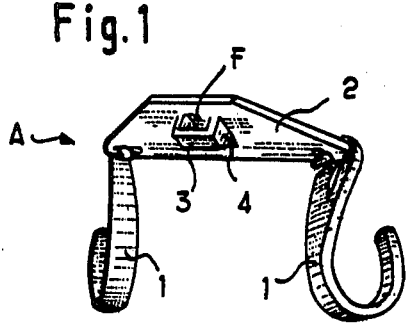
FIGS. 1 to 7 show a number of camping accessories forming a set in accordance with the invention.
Figure 2:
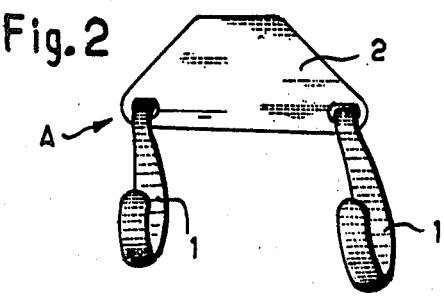

In FIGS. 1 and 2 can be seen an accessory A comprising a coat-rack formed from two hooks 1 and a support 2 which will be used in a vertical position. This latter carries on its rear face, and moulded therewith, the female part F of a hook-on member whose male part will be described further on. This female part F which is to be found again on the five other accessories of FIGS. 3 to 7, is formed by a channel having four walls; the front wall merges with support 2 itself; rear wall 3 is rectangular; side walls 4 are chamfered towards the bottom.

Figure 3:
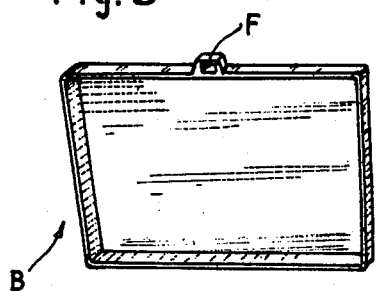
Figure 4:
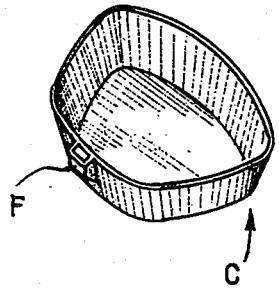

Accessory B of FIG. 3 is a tray intended to be used in the horizontal position, as also the container of FIG. 4.

Figure 5:
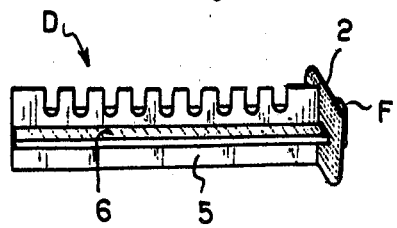

In FIG. 5 there is shown a coat-hanger rack D whose support 2, which receives the female part F, is integral with a toothed bar 5 for the coat-hangers, stiffened by two wings 6.

Figure 6:
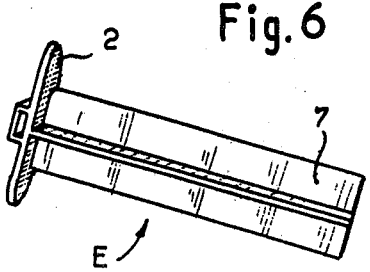

A similar support 2 is integral, according to FIG. 6, with a roller holder E formed by a cross-shaped shaft 7 on which may be fitted, according to its size, a roll of toilet paper, a roll of household paper or else a roll of aluminum sheet.

Figure 7:
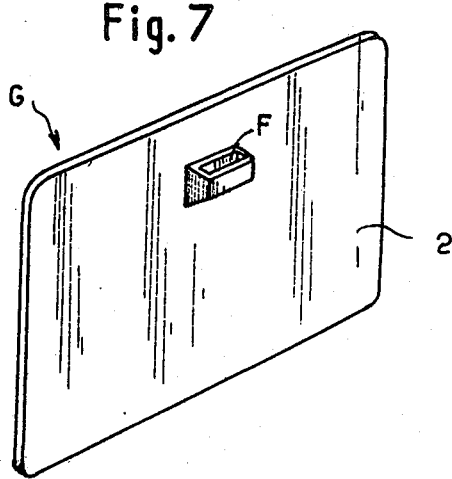

Finally accessory G of FIG. 7 is a mirror of which only the rear face forming support 2 is visible.

It is any one of supports 2 which is partially shown in perspective in FIG. 8 and in section in FIGS. 9 and 10. We naturally find again in these figures the female part F with its rectangular rear face 3 provided at its lower front part with a slight chamfer 3' and its said faces chamfered. Furthermore, these figures show the male part M of the hook-on members, formed by a nose 8 whose end is split at 9 so that its rear part has a slight resilience used for forming, by means of a suitable projection, a barb 10.

The nose is moulded with the ball joint 11 which is intended to cooperate with clip P which will now be described.

This clip comprises two similar jaws 12 and 13, drilled so that there may pass therethrough bolt 14 whose polygonal head is advantageously locked in a suitable housing in jaw 13 and which cooperates with a wing nut 15. Each jaw carries on the one hand a series of parallel indentations 16 and, on the other hand, a cup 17 having the same diameter as ball joint 11.

The assembly thus described is used in the following way.

On hook 8 of the male part M is locked the accessory which it is desired to secure by sliding the hook in the channel formed by bottom 2 and walls 3 and 4 of female part F. This operation which is carried out by moving the hook in the direction of arrow f in FIG. 9 is facilitated by the chamfered shape of walls 4 and by the resilience of the barb. It is made easier because of the slight chamfer 3' provided at the lower front part of wall 3. At the end of the operation the parts are in the position shown in FIG. 10, and the barb having come back to its rest position ensures their interlocking. With the ball joint placed in cups 17, the user clamps in jaws 12 and 13 any substantially cylindrical body shown in FIG. 10 as a tube T and slightly tightens nut 15. He then places the accessory which he has chosen in the desired position and interlocks the whole by tightening nut 15. It should be noted here that because of the remarkable organisation of the elements forming the invention, the user may place the accessory in any desired position, whatever the orientation of member T.

To make the drawings more easily understandable, it has been assumed, in FIG. 10, that the accessory is for example the tray P which is desired horizontal. But it could be mirror G orientated upwards or downwards. Moreover, whether it is the tray or the mirror, a slanting disposition in relation to the plane of the drawing or to the axis of the tube could be chosen. Similarly, tube T has been shown horizontal but it is clear that the accessory may be placed in the desired position whatever the position of tube T. This latter could be vertical or slanting, i.e. could occupy any position whatsoever in the plane perpendicular to the plane of the drawing. But it could also occupy any other position in any other non vertical plane without the placing of the accessory being in any way made more complicated.

Reference will now be made to FIGS. 11 and 12 which show a variation of the female part of the hook-on members, a variation which is advantageous in some cases at the stage of mounting the accessories. According to this variation, the rear face 3 of the channel has a window 18 and the front face, merging with support 2, a window 19. To facilitate the introduction of hook 8, it has shown useful to provide in window 19 a cross-piece 20 whose lower rear part is slightly chamfered at 20'. It goes without saying that accessories provided with such a channel are used in exactly the same way as those of FIGS. 1 to 7.

What is claimed is:

1. A combination of at least one camping accessory and an adjustable bracket therefor, comprising
two, substantially identical, facing jaws, each said jaw having a generally semi-cylindrical recess and a generally semi-spherical recess on a facing surface thereof and adjacent opposite ends thereof;
a generally spherical member positioned between said semispherical recesses;
clamping means, coupled to said jaws, for forcing said jaws together to secure a generally cylindrical support in said recesses and to fix said jaws relative to said spherical member; and
first and second attachment means for detachably coupling said accessory and said spherical member, said first attachment means comprising a generally U-shaped member having a back wall and two side walls extending from opposite ends of said back wall and fixed at ends thereof remote from said back wall to one of said accessory and said spherical member to space said back wall therefrom and to form a channel, said second attachment means including a hook member fixed to and extending from the other of said accessory and said spherical member for extending through said channel and engaging said U-shaped member.

2. A combination according to claim 1, wherein said first attachment means extends from a rear face of said accessory and said second attachment means extends from said spherical member.

3. A combination according to claim 2, wherein said rear face and back wall have aligned openings therein.

4. A combination according to claim 3, wherein said opening in said rear face has a cross-piece with a chamfered lower edge.

5. A combination according to claim 1, wherein lower edges of said side walls of said U-shaped member are chamfered.

6. A combination according to claim 1, wherein a lower edge of said back wall of said U-shaped member is chamfered forming a tapered lead-in for said channel.

7. A combination according to claim 1, wherein said hook member has a nose portion at a free end thereof which is split to form a resilient locking barb.

8. A combination according to claim 1, wherein said hook member is L-shaped.

9. A combination according to claim 1, wherein said clamping means comprises a bolt passing through said jaws and a nut threaded thereon.

* * * * *